US011357077B2

(12) United States Patent
Yang et al.

(10) Patent No.: US 11,357,077 B2
(45) Date of Patent: Jun. 7, 2022

(54) DATA FORWARDING METHOD, APPARATUS, AND SYSTEM

(71) Applicant: Huawei Technologies Co., Ltd., Shenzhen (CN)

(72) Inventors: Jiao Yang, Xi'an (CN); Yan Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/822,674

(22) Filed: Mar. 18, 2020

(65) Prior Publication Data

US 2020/0221539 A1 Jul. 9, 2020

Related U.S. Application Data

(63) Continuation of application No. PCT/CN2018/088539, filed on May 26, 2018.

(30) Foreign Application Priority Data

Oct. 16, 2017 (CN) ......................... 201710970392.8

(51) Int. Cl.
*H04W 80/10* (2009.01)
*H04W 8/08* (2009.01)
(Continued)

(52) U.S. Cl.
CPC ............ *H04W 80/10* (2013.01); *H04W 8/08* (2013.01); *H04W 28/0263* (2013.01);
(Continued)

(58) Field of Classification Search
None
See application file for complete search history.

(56) References Cited

U.S. PATENT DOCUMENTS

2017/0289019 A1 10/2017 Faccin et al.
2018/0270873 A1 9/2018 Cho et al.
(Continued)

FOREIGN PATENT DOCUMENTS

CN 104113918 A 10/2014
WO 2015160329 A1 10/2015
(Continued)

OTHER PUBLICATIONS

3GPP TS 23.502 V1.2.0 "3rd Generation Partnership Project; Technical Specification Group Services and System Aspects; Procedures for the 5G System; Stage 2 (Release 15)," XP051359409, Sep. 2017,165 pages.

(Continued)

*Primary Examiner* — Eunsook Choi
(74) *Attorney, Agent, or Firm* — Conley Rose, P.C.

(57) ABSTRACT

A data forwarding method includes receiving, by a session management function network element, information about a first bearer in a first network from an access and mobility management function network element; and sending flow information of a first flow in a second network and forwarding information to the access and mobility management function network element. The flow information indicates a flow for data forwarding, and the forwarding information is used for forwarding the first flow to a tunnel corresponding to the first bearer.

20 Claims, 9 Drawing Sheets

(51) Int. Cl.
*H04W 76/12* (2018.01)
*H04W 76/11* (2018.01)
*H04W 28/02* (2009.01)
*H04W 48/16* (2009.01)

(52) U.S. Cl.
CPC ............ *H04W 48/16* (2013.01); *H04W 76/11* (2018.02); *H04W 76/12* (2018.02)

(56) References Cited

U.S. PATENT DOCUMENTS

2019/0109823 A1* 4/2019 Qiao .................. H04L 12/1492
2020/0084815 A1* 3/2020 Rinne .................. H04W 76/11
2020/0120570 A1* 4/2020 Youn ................. H04W 36/0033
2021/0014765 A1* 1/2021 Shan ....................... H04W 8/02

FOREIGN PATENT DOCUMENTS

WO 2017047878 A1 3/2017
WO 2017172264 A1 10/2017
WO 2019031941 A1 2/2019

OTHER PUBLICATIONS

3GPP TS 29.274, V15.1.0, "3rd Generation Partnership Project; Technical Specification Group Core Network and Terminals; 3GPP Evolved Packet System (EPS); Evolved General Packet Radio Service (GPRS) Tunnelling Protocol tor Control plane (GTPv2-C); Stage 3 (Release15)," XP051337004, Sep. 18, 2017, 371 pages.

3GPP TS 23.401 V15.1.0 "3rd Generation Partnership Project; Technical Specification Group Services and System Aspects; General Packet Radio Service (GPRS) enhancements for Evolved Universal Terrestrial Radio Access Network (E-UTRAN) access (Release 15)," Sep. 2017, 397 pages.

3GPP TS 23.501 V1.4.0, "3rd Generation Partnership Project; Technical Specification Group Services and System Aspects; System Architecture for the 5G System; Stage 2(Release 15)," Sep. 2017, 151 pages.

Samsung, "Data forwarding for Inter-system Inter-RAT handover from 5GS to EPS," 3GPP TSG-RAN WG3 Meeting #97, R3-172974, Berlin, Germany, Aug. 21-25, 2017, 6 pages.

Ericsson, "Allocation of EPS bearer ID in 5GS," SA WG2 Meeting #122 S2-174196, Jun. 26-30, 2017, San Jose Del Sabo, Mexico, 8 pages.

3GPP TS 23.502 V1.3.0 (Nov. 2017), 3rd Generation Partnership Project; Technical Specification Group Services and System Aspects; Procedures for the 5G System;Stage 2(Release 15), 215 pages.

Huawei, HiSilicon, TS 23.502 Update of 5GS to EPS handover using N26 interface procedure. SA WG2 Meeting #123, Oct. 23-27, 2017, Ljubljana, S2-177380, 4 pages.

* cited by examiner

DATA FORWARDING METHOD, APPARATUS, AND SYSTEM

CROSS-REFERENCE TO RELATED APPLICATIONS

This application is a continuation of International Application No. PCT/CN2018/088539, filed on May 26, 2018, which claims priority to Chinese Patent Application No. 201710970392.8, filed on Oct. 16, 2017. The disclosures of the aforementioned applications are hereby incorporated by reference in their entireties.

TECHNICAL FIELD

This application relates to the field of wireless communications technologies, and in particular, to a data forwarding method, apparatus, and system.

BACKGROUND

Currently, 2nd generation mobile communication technology/3rd generation mobile communication technology (2G/3G) networks have been widely deployed in many areas. As communications technologies develop rapidly, Long-Term Evolution (LTE) networks and the like have covered some urban areas and traffic hotspot areas. In addition, new 5th generation mobile communication technology (5G) networks are being deployed. Therefore, the 5G, LTE, and 2G/3G networks coexist in these areas in the future. In other words, in a relatively long period of time, networks of different systems (such as the 2G, 3G, LTE, and 5G networks) coexist and jointly provide services for users. In view of this, inter-system interworking is introduced on a network side. Interworking is an important guarantee for service continuity between different systems. Through inter-system interworking, an operator can implement complementation between networks of different systems, improving coverage of an existing network, and improving network quality.

In some approaches, after a handover from 5G to LTE is initiated, an access network device in the 5G network forwards all received flows to a user plane function (UPF) network element, and the UPF network element forwards a flow that has a corresponding forwarding tunnel, and discards a flow that has no corresponding forwarding tunnel, causing a waste of transmission resources.

SUMMARY

This application describes a data forwarding method, apparatus, and system.

According to an aspect, an embodiment of this application provides a data forwarding method, and the method includes receiving, by a session management function network element, information about a first bearer in a first network from an access and mobility management function network element; and sending flow information of a first flow (for example, a quality of service (QoS) flow) in a second network and forwarding information (which may also be referred to as tunnel information) to the access and mobility management function network element, where the flow information indicates a flow for data forwarding, and the forwarding information is used for forwarding the first flow to a tunnel corresponding to the first bearer. According to the foregoing solution, the session management function network element sends the flow information and the forwarding information to the access and mobility management function network element, and then the access and mobility management function network element provides the flow information and the forwarding information for an access network device in the second network. The access network device in the second network may send, to a user plane function network element based on the flow information and the forwarding information, only a flow required for data forwarding, so the access network device does not need to forward all flows to the user plane function network element, thereby reducing transmission resources.

In a possible design, the method further includes determining, by the session management function network element, the first flow based on the information about the first bearer and association information, where the association information indicates an association between the first flow and the first bearer.

In a possible design, before the receiving, by a session management function network element, information about a first bearer in a first network from an access and mobility management function network element, the method further includes receiving, by the session management function network element, a flow list from the access and mobility management function network element; determining, based on the flow list and association information, a bearer for data forwarding; and indicating, to the access and mobility management function network element, the bearer for data forwarding. The flow list includes the flow information. The bearer for data forwarding is associated with a flow in the flow list, and the bearer for data forwarding includes the first bearer. The foregoing steps are applicable to a scenario in which the access network device in the second network determines a flow for data forwarding.

In another possible design, before the receiving, by a session management function network element, information about a first bearer in a first network from an access and mobility management function network element, the method further includes determining, by the session management function network element based on association information, a bearer for data forwarding; and indicating, to the access and mobility management function network element, the bearer for data forwarding. The bearer for data forwarding includes the first bearer. The foregoing steps are applicable to a scenario in which the session management function network element determines a flow for data forwarding.

In a possible design, the flow information further includes identification information of a second flow in the second network, and the forwarding information is used for forwarding the first flow to the tunnel corresponding to the first bearer and for forwarding the second flow to a tunnel corresponding to a second bearer. The first bearer and the second bearer may be a same bearer. In other words, the forwarding information is at a granularity of a session and may indicate forwarding information of flows in the session.

In another possible design, the flow information further includes identification information of a second flow in the second network, and the forwarding information includes first forwarding information and second forwarding information, where the first forwarding information is used for forwarding the first flow to the tunnel corresponding to the first bearer, and the second forwarding information is used for forwarding the second flow to a tunnel corresponding to a second bearer. The first bearer and the second bearer may be a same bearer. In other words, the forwarding information is at a granularity of a flow, and each flow has corresponding forwarding information. In this case, the method may further include allocating, by the session management function network element, the first forwarding information to the first flow, and allocating the second forwarding information to the second flow. That is, the session management function network element allocates the forwarding information at a granularity of a flow.

In a possible design, the method further includes determining, by the session management function network element, a data forwarding rule, and sending the data forwarding rule to a user plane function network element, where the data forwarding rule indicates that the tunnel corresponding to the first bearer is used for forwarding the first flow. In this case, the user plane function network element may forward, according to the forwarding rule, the first flow to the tunnel corresponding to the first bearer. In this way, a problem of how the user plane function network element forwards a flow in the second network to a bearer in the first network by is resolved.

According to another aspect, this application further discloses a data forwarding method, including sending, by an access and mobility management function network element, information about a first bearer in a first network to a session management function network element; receiving flow information of a first flow in a second network and forwarding information from the session management function network element; and sending the flow information and the forwarding information to an access network device in the second network. The flow information indicates a flow for data forwarding, and the forwarding information is used for forwarding the first flow to a tunnel corresponding to the first bearer. According to the foregoing solution, after receiving the flow information and the forwarding information from the session management function network element, the access and mobility management function network element sends the flow information and the forwarding information to the access network device in the second network. The access network device in the second network may send, to a user plane function network element based on the flow information and the forwarding information, only a flow required for data forwarding, so the access network device does not need to forward all flows to the user plane function network element, thereby reducing transmission resources.

In a possible design, before the sending, by an access and mobility management function network element, information about a first bearer in a first network to a session management function network element, the method further includes sending, by the access and mobility management function network element, a flow list to the session management function network element; learning, from the session management function network element, of a bearer for data forwarding; and indicating, to a core network control plane network element in the first network, the bearer for data forwarding. The flow list includes the flow information. The bearer for data forwarding is associated with a flow in the flow list, and the bearer for data forwarding includes the first bearer. For example, the access and mobility management function network element sends a request message to the core network control plane network element in the first network, where the request message includes information to be sent to an access network device in the first network, and the information to be sent to the access network device in the first network indicates the bearer for data forwarding. The information to be sent to the access network device in the first network may be a transparent container. The steps in this possible design are applicable to a scenario in which an access network device in the second network determines a flow for data forwarding. In a scenario in which the session management function network element determines a flow for data forwarding, the access and mobility management function network element may directly receive, from the session management function network element, the bearer for data forwarding, without sending the flow list to the session management function network element.

According to still another aspect, this application further discloses a data forwarding method, including receiving, by an access network device in a second network, flow information of a first flow in the second network and forwarding information from an access and mobility management function network element; and receiving, by the access network device, the first flow, and sending the first flow to a user plane function network element based on the flow information and the forwarding information. The flow information indicates a flow for data forwarding, and the forwarding information is used for forwarding the first flow to a tunnel corresponding to a first bearer in a first network. According to the foregoing solution, after receiving the flow information and the forwarding information from the access and mobility management function network element, the access network device in the second network may send, to the user plane function network element based on the flow information and the forwarding information, only a flow required for data forwarding, so the access network device does not need to forward all flows to the user plane function network element, thereby reducing transmission resources.

In a possible design, the method further includes determining, by the access network device, a list of flows for data forwarding; and sending, by the access network device, the flow list to the access and mobility management function network element, where the flow list is used to determine a bearer for data forwarding, the flow list includes the flow information, the bearer for data forwarding is associated with a flow in the flow list, and the bearer for data forwarding includes the first bearer. The foregoing steps are applicable to a scenario in which the access network device in the second network initiates determining of a flow for data forwarding.

In the foregoing aspects and possible designs, the forwarding information may be at a granularity of a session, or may be at a granularity of a flow.

According to still another aspect, an embodiment of this application provides a data forwarding apparatus, and the data forwarding apparatus has functions for implementing operations of the session management function network element in the foregoing methods. The function may be implemented by using hardware, or may be implemented by executing corresponding software by hardware. The hardware or the software includes one or more modules corresponding to the foregoing functions. In a possible design, a structure of the data forwarding apparatus includes a processor and a transceiver. The processor is configured to perform corresponding functions of the session management function network element in the foregoing methods, and the transceiver is configured to implement communication between the session management function network element and an access and mobility management function network element/a user plane function network element. The data forwarding apparatus may further include a memory. The memory is configured to be coupled to the processor, and the memory stores a necessary program instruction and data of the session management function network element.

According to still another aspect, an embodiment of this application provides a data forwarding apparatus, and the data forwarding apparatus has functions for implementing operations of the access and mobility management function network element in the foregoing methods. The function may be implemented by using hardware, or may be implemented by executing corresponding software by hardware. The hardware or the software includes one or more modules corresponding to the foregoing functions. In a possible design, a structure of the data forwarding apparatus includes a processor and a transceiver. The processor is configured to perform corresponding functions of the access and mobility management function network element in the foregoing methods, and the transceiver is configured to implement communication between the access and mobility management function network element and a session management function network element/an access network device in a second network/a core network control plane network element in a first network. The data forwarding apparatus may further include a memory. The memory is configured to be coupled to the processor, and the memory stores a necessary program instruction and data of the access and mobility management function network element.

According to still another aspect, an embodiment of this application provides a data forwarding apparatus, and the data forwarding apparatus has functions for implementing operations of the access network device in the second network in the foregoing methods. The function may be implemented by using hardware, or may be implemented by executing corresponding software by hardware. The hardware or the software includes one or more modules corresponding to the foregoing functions. In a possible design, a structure of the data forwarding apparatus includes a processor and a transceiver. The processor is configured to perform corresponding functions of the access network device in the second network in the foregoing methods, and the transceiver is configured to implement communication between the access network device in the second network and an access and mobility management function network element/a user plane function network element. The data forwarding apparatus may further include a memory. The memory is configured to be coupled to the processor, and the memory stores a necessary program instruction and data of the access network device in the second network.

According to still another aspect, an embodiment of this application provides a computer readable storage medium. The computer readable storage medium stores an instruction, and when the instruction runs on a computer, the computer performs the methods in the foregoing aspects.

According to still another aspect, an embodiment of this application provides a computer program product including an instruction, and when the instruction runs on a computer, the computer performs the methods in the foregoing aspects.

According to still another aspect, this application provides a chip system, and the chip system includes a processor configured to support the foregoing session management function network element/access and mobility management function network element/access network device in the second network in implementing the functions in the foregoing aspects, for example, generating or processing the information in the foregoing aspects. In a possible design, the chip system further includes a memory, and the memory is configured to store a necessary program instruction and data of a data forwarding apparatus. The chip system may include a chip, or may include a chip and another discrete device.

BRIEF DESCRIPTION OF DRAWINGS

The following briefly describes the accompanying drawings required for describing the embodiments.

DESCRIPTION OF EMBODIMENTS

The following clearly describes the technical solutions in the embodiments of this application with reference to the accompanying drawings in the embodiments of this application.

A terminal in this application may include a handheld device having a wireless communication function, an in-vehicle device, a wearable device, a computing device, or another processing device connected to a wireless modem, user equipment (UE) in various forms, a mobile station (MS), a terminal, a terminal device, and the like. For ease of description, in the embodiments of this application, an example in which the terminal is UE is used for description.

Figure 1:
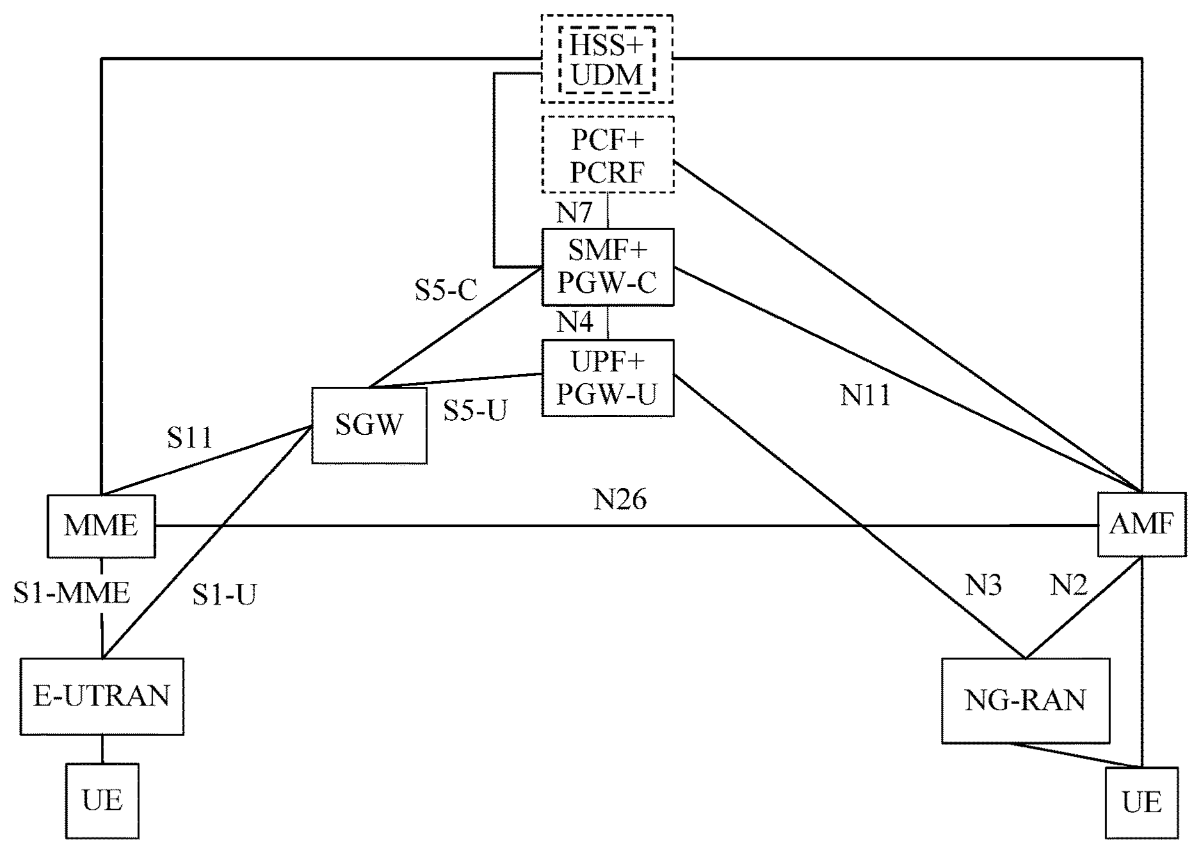
FIG. 1 is a schematic diagram of an architecture of a non-roaming scenario in which interworking is performed between a 5G system and a 4G system and to which an embodiment of this application is applicable.

A data forwarding method in the embodiments of this application is applicable to various system architectures. FIG. 1 is a schematic diagram of an architecture of a non-roaming scenario in which interworking is performed between a 5G system and a 4G system and to which an embodiment of this application is applicable.

As shown in FIG. 1, the 4G system in the system architecture includes an Evolved Universal Terrestrial Radio Access Network (E-UTRAN), a mobility management entity (MME), a serving gateway (SGW), a packet data network (PDN) gateway control plane (PGW-C), a PDN gateway user plane (PGW-U), a policy and charging rules function (PCRF), and a home subscriber server (HSS). There is an S1-MME interface between the E-UTRAN and the MME. There is an S1-U interface between the E-UTRAN and the SGW. There is an S11 interface between the MME and the SGW. There is an S5-C interface between the SGW and the PGW-C. There is an S5-U interface between the SGW and the PGW-U.

The 5G system includes a next generation radio access network (NG-RAN, also referred to as a 5G access network, 5G RAN), an access and mobility management function (AMF) network element, a UPF network element, a session management function (SMF) network element, a policy control function (PCF) network element, and a unified data management (UDM) network element. There is an N2 interface between the NG-RAN and the AMF. There is an N3 interface between the NG-RAN and the UPF. There is an N11 interface between the AMF and the SMF.

When interworking is required between the 5G system and the 4G system, as shown in FIG. 1, the UPF and the PGW-U may be integrated, and may be referred to as a UPF+PGW-U after they are integrated. Similarly, the SMF and the PGW-C may be integrated, and may be referred to as a PGW-C+SMF after they are integrated. There is an N26 interface between the AMF in the 5G system and the MME in the 4G system. The N26 interface is used for interworking between an evolved packet core (EPC) and a Next Generation Core (NG core). For example, the AMF can select a target MME, and send a context (for example, MM context information and SM context information) of UE to the target MME by using the N26 interface, to implement a handover from the 5G system to the 4G system.

In the following descriptions, a first network is a 4G network in the scenario in which interworking is performed between the 5G system and the 4G system, that is, a network including the UE, the E-UTRAN, the MME, the SGW, the PGW-C, and the PGW-U in FIG. 1; and a second network is a 5G network in the scenario in which interworking is performed between the 5G system interworks and the 4G system, that is, a network including the UE, the NG-RAN, the AMF, the SMF, and the UPF in FIG. 1. In addition, the first network may include another network element in the 4G system, and the second network may include another network element in the 5G system. This is not limited in the present disclosure.

Figure 2:
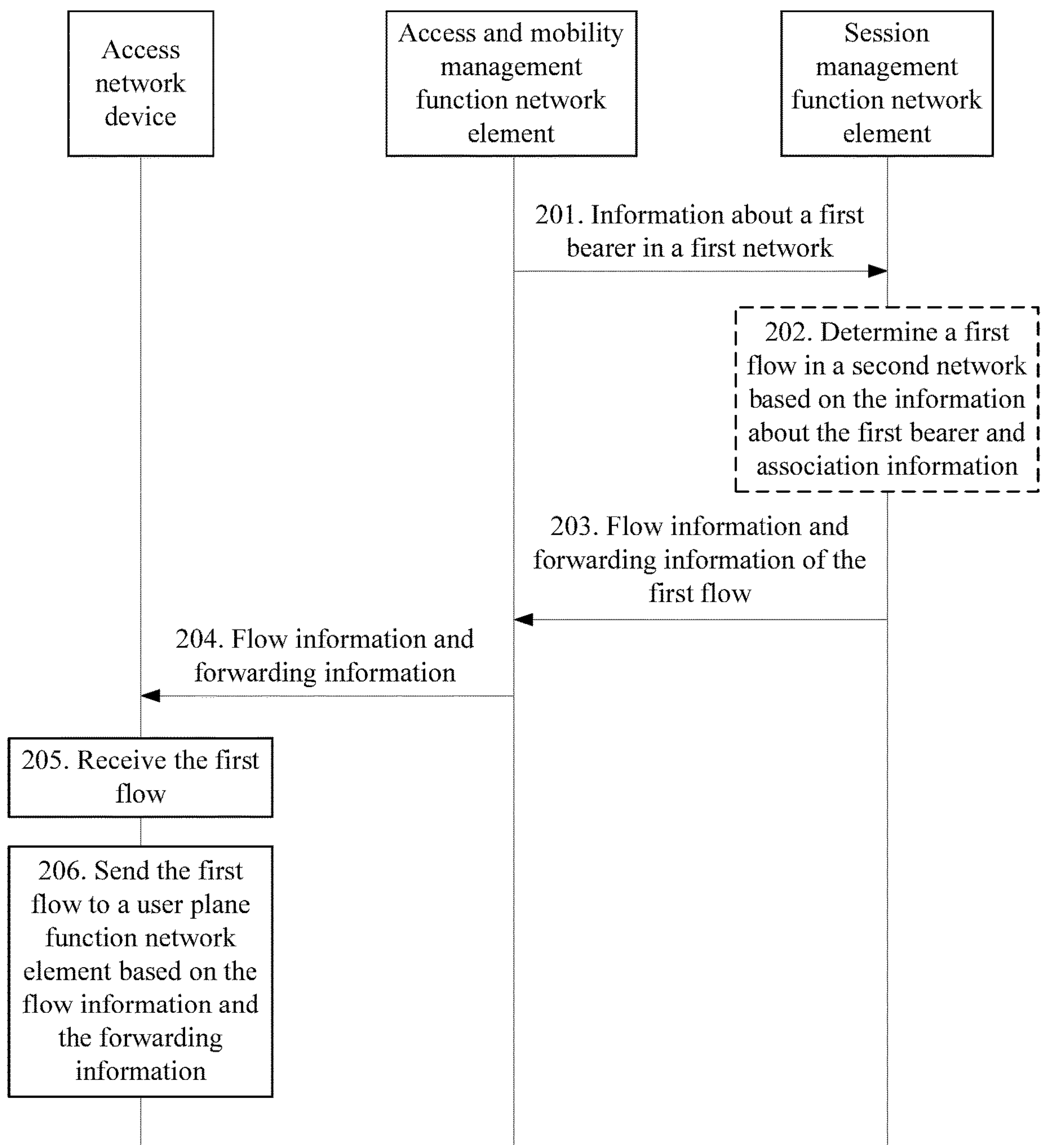
FIG. 2 is a schematic diagram of a data forwarding method according to an embodiment of the present disclosure.

FIG. 2 is a schematic diagram of a data forwarding method according to an embodiment of the present disclosure. In an example in FIG. 2, the data forwarding method relates to interaction between an access network device, an access and mobility management function network element, and a session management function network element.

The access network device in this embodiment of this application is an access network device in a second network. For example, the access network device may be the NG-RAN in FIG. 1. The access network device may include various forms of base stations, such as a macro base station, a micro base station (also referred to as a small cell), a relay station, and an access point. For example, the access network device may be a gNodeB (gNB).

The access and mobility management function network element in this embodiment of this application may be the AMF network element in FIG. 1, and is responsible for UE registration, mobility management, a tracking area update procedure, and the like. For ease of description, the AMF network element may be referred to as the "AMF" for short below.

The session management function network element in this embodiment of this application may be the SMF network element in FIG. 1, and is responsible for UE session management, selection of a user plane function network element, reselection of a user plane function network element, IP address allocation, QoS control, and session establishment, modification, and release. For ease of description, the SMF network element may be referred to as the "SMF" for short below.

The access network device, the access and mobility management function network element, and the session management function network element may be implemented by using specified hardware, may be implemented by using a software instance on specified hardware, or may be implemented by using a virtual function instantiated on an appropriate platform. This is not limited herein in the present disclosure.

The data forwarding method according to this embodiment of this application is described below with reference to FIG. 2. The method includes the following steps.

Step 201, the access and mobility management function network element sends information about a first bearer in a first network to the session management function network element, and correspondingly, the session management function network element receives the information about the first bearer from the access and mobility management function network element.

For example, in step 201, the access and mobility management function network element sends information about at least one bearer in the first network to the session management function network element. The at least one bearer includes the first bearer.

Optionally, the information about the first bearer may be represented by using tunnel information of the GPRS tunneling protocol (GTP) of 4G. For example, the information about the first bearer is SGW information. The SGW information includes a tunnel endpoint identifier (TEID) of an SGW. For example, the TEID of the SGW may be an SGW TEID (which may be referred to as an SGW F-TEID) used for forwarding downlink data. Optionally, the SGW information may further include an address of the SGW.

Alternatively, optionally, the information about the first bearer may be identification information of the first bearer. For example, the identification information of the first bearer may be an evolved packet system (EPS) bearer identifier (ID).

Alternatively, optionally, the information about the first bearer may be a combination of the SGW information and the identification information of the first bearer.

For example, the access and mobility management function network element may obtain the information about the first bearer from an MME of 4G by using an N26 interface. This is described in detail with reference to FIG. 4A and FIG. 4B. After obtaining the information about the first bearer, the access and mobility management function network element sends the information about the first bearer to the session management function network element.

Step 202, the session management function network element determines a first flow in a second network based on the information about the first bearer and association information, where the association information indicates an association between the first flow and the first bearer.

The first flow in the second network may be a quality of service (QoS) flow of 5G. The first flow is a flow for data forwarding.

Figure 3:
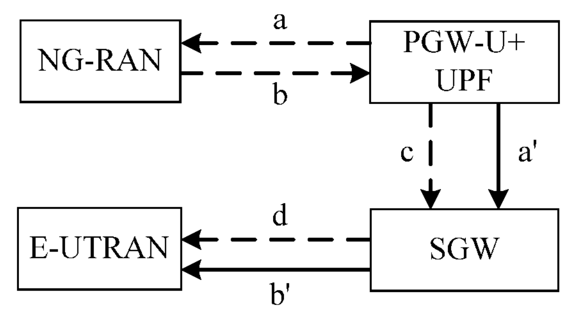
FIG. 3 is a schematic diagram of a path for forwarding downlink data and a path of normal downlink data.

For example, the association between the first flow and the first bearer means that data may be indirectly forwarded on the first flow in the 5G system by using a tunnel corresponding to the first bearer in the 4G system. For example, as shown in FIG. 3, data between an NG-RAN and a UPF in the 5G system is transmitted in a form of a QoS flow. In the 4G system, a different transmission manner is used. Specifically, an S5/S8 bearer may be used for data transmission between a PGW-U and an SGW, and an S1 bearer may be used for data transmission between the SGW and an E-UTRAN. Therefore, during a handover from the 5G system to the 4G system, the QoS flow needs to be forwarded to the tunnel corresponding to the first bearer (the S5/S8 bearer or the S1 bearer) in the 4G system. Therefore, there is the association (or referred to as a correspondence) between the first flow and the first bearer. For example, in a process of establishing a packet data unit (PDU) session and a QoS flow, the session management function network element may perform mapping between a bearer and a QoS flow, to obtain a correspondence between each flow and each bearer (including the correspondence between the first flow and the first bearer).

For example, in a possible implementation, the association information includes an association between bearer information (for example, the bearer information is an SGW TEID), a bearer identifier, and a flow. For example, the association information is in a form shown in Table 1.

TABLE 1

| | | |
|---|---|---|
| SGW TEID1 | Bearer 1 | Flow A |
| SGW TEID2 | Bearer 2 | Flow B |

As shown in Table 1, the SGW TEID1 is bearer information of the bearer 1, and the bearer 1 is corresponding to the flow A. The SGW TEID2 is bearer information of the bearer 2, and the bearer 2 is corresponding to the flow B. Assuming that the information, received by the session management function network element, about the first bearer is the SGW TEID1, the session management function network element may determine, based on the association information, that a flow that is in the second network and that is corresponding to the first bearer is the flow A.

In another possible implementation, the association information includes an association between bearer information (for example, the bearer information is an EPS bearer ID) and a flow. For example, the association information is in a form shown in Table 2.

TABLE 2

| | |
|---|---|
| EPS bearer ID1 | Flow A |
| EPS bearer ID2 | Flow B |

As shown in Table 2, the EPS bearer ID1 is bearer information of a bearer 1, and the bearer 1 is corresponding to the flow A. The EPS bearer ID2 is bearer information of a bearer 2, and the bearer 2 is corresponding to the flow B. Assuming that the information, received by the session management function network element, about the first bearer is the EPS bearer ID1, the session management function network element may determine, based on the association information, that a flow that is in the second network and that is corresponding to the first bearer is the flow A.

After the session management function network element determines the first flow, flow information of the first flow and forwarding information may be determined.

The flow information indicates a flow for data forwarding (that is, indicate that the first flow is a flow required for data forwarding). In other words, the flow information may be used to determine a specific flow for data forwarding. This is further described with reference to step 206. Optionally, the flow information of the first flow may include a QoS flow identifier (QFI) of the first flow.

The forwarding information is used for forwarding the first flow to the tunnel corresponding to the first bearer. The forwarding information may also be referred to as tunnel information. For example, the forwarding information may be used to identify a user plane function network element, and the user plane function network element is configured to forward the first flow to the tunnel corresponding to the first bearer. Optionally, the forwarding information is core network tunnel information for data forwarding (CN tunnel information for data forwarding). The forwarding information may be allocated by the session management function network element, or allocated by the user plane function network element. This is further described with reference to FIG. 4A and FIG. 4B.

A session in the 5G system may include a plurality of flows requiring data forwarding (the plurality of flows include the first flow). In a possible implementation, the forwarding information may include a QFI of each of the plurality of flows. For example, the flow information further includes identification information of a second flow in the second network. The forwarding information is used for forwarding the first flow to the tunnel corresponding to the first bearer and for forwarding the second flow to a tunnel corresponding to a second bearer. The second bearer and the first bearer may be a same bearer or different bearers. In this case, the forwarding information is forwarding information at a granularity of a session.

In another possible implementation, each of the plurality of flows has forwarding information dedicated to the flow, that is, the forwarding information includes a QFI of a flow. For example, the flow information further includes identification information of a second flow in the second network. The forwarding information includes first forwarding information and second forwarding information. The first forwarding information is used for forwarding the first flow to the tunnel corresponding to the first bearer, and the second forwarding information is used for forwarding the second flow to a tunnel corresponding to a second bearer. For example, the session management function network element allocates the first forwarding information to the first flow, and allocates the second forwarding information to the second flow. Similarly, the second bearer and the first bearer may be a same bearer or different bearers. In this case, the forwarding information is forwarding information at a granularity of a flow. In addition, the forwarding information may be at another granularity. This is not limited herein in the present disclosure.

Step 202 is an optional step. The session management function network element may alternatively obtain the flow information of the first flow and the forwarding information in another manner. This is not limited herein in the present disclosure.

Step 203, the session management function network element sends flow information and forwarding information to the access and mobility management function network element, and correspondingly, the access and mobility management function network element receives the flow information and the forwarding information from the session management function network element.

Step 204, the access and mobility management function network element sends the flow information and the forwarding information to an access network device in the second network, and correspondingly, the access network device in the second network receives the flow information and the forwarding information from the access and mobility management function network element.

Step 205, the access network device in the second network receives the first flow.

For example, the access network device receives the first flow from a first user plane function network element.

Step 206, the access network device sends the first flow to a user plane function network element based on the flow information and the forwarding information.

For example, if the access network device determines, based on the flow information, that the first flow is a flow for data forwarding, the access network device sends the first flow to a second user plane function network element based on the forwarding information, so that the second user plane function network element forwards the first flow to the tunnel corresponding to the first bearer. In other words, the flow information may be used to determine a specific flow required for data forwarding, that is, the flow information may be used to select, from flows received by the access network device, a flow required for data forwarding.

For example, a plurality of flows received by the access network device in step 205 include the first flow, the second flow, and a third flow. If the flow information received by the access network device in step 204 includes flow information of the first flow and flow information of the second flow, the access network device determines that the first flow and the second flow are flows for data forwarding. Because the flow information does not include flow information of the third flow, the access network device determines that the third flow is not a flow for data forwarding.

As shown in FIG. 3, the access network device (NG-RAN) receives the first flow from the first user plane function network element (PGW-U+UPF) in step a, and after determining that the first flow is a flow for data forwarding, sends the first flow to the second user plane function network element (PGW-U+UPF) in step b, so that the second user plane function network element forwards the first flow to the tunnel corresponding to the first bearer (that is, the first flow is forwarded to an SGW in step c, and the first flow is forwarded to an E-UTRAN in step d), to forward downlink data. Therefore, a forwarding path of a flow for data forwarding is a→b→c→d, and this is specifically as follows.

PGW-U+UPF→NG-RAN→PGW-U+UPF→SGW→E-UTRAN

It should be noted that the first user plane function network element and the second user plane function network element may be a same user plane function network element or different user plane function network elements. This is not limited herein in the present disclosure.

Therefore, according to the data forwarding method in this embodiment of this application, the session management function network element sends the flow information and the forwarding information to the access and mobility management function network element, and then the access and mobility management function network element provides the flow information and the forwarding information for the access network device in the second network. The access network device in the second network may send, to the user plane function network element based on the flow information and the forwarding information, only a flow required for data forwarding, so the access network device does not need to forward all flows to the user plane function network element, thereby reducing transmission resources.

Optionally, the method further includes determining, by the session management function network element, a data forwarding rule, and sending the data forwarding rule to the user plane function network element (for example, the second user plane function network element), where the data forwarding rule indicates that the tunnel corresponding to the first bearer is used for forwarding the first flow. In this way, a problem of how the user plane function network element forwards a flow in the second network to a bearer in the first network by is resolved. This is further described with reference to FIG. 3, FIG. 4A, and FIG. 4B.

In a possible implementation, the access network device in the second network may initially determine a flow for data forwarding.

In this scenario, a method on the access network device side includes determining, by the access network device, a list of flows for data forwarding, where the flow list is used to determine a bearer for data forwarding; and sending the flow list to the access and mobility management function network element.

Correspondingly, before the access and mobility management function network element sends the information about the first bearer to the session management function network element, a method on the access and mobility management function network element side further includes receiving, by the access and mobility management function network element, the flow list from the access network device, and sending the flow list to the session management function network element; learning, by the access and mobility management function network element from the session management function network element, of the bearer for data forwarding; and indicating, by the access and mobility management function network element to a core network control plane network element in the first network, the bearer for data forwarding.

Correspondingly, before the session management function network element receives the information about the first bearer from the access and mobility management function network element, a method on the session management function network element side further includes receiving, by the session management function network element, the flow list from the access and mobility management function network element; determining, based on the flow list and association information, the bearer for data forwarding; and indicating, to the access and mobility management function network element, the bearer for data forwarding.

The flow list includes the flow information. The bearer for data forwarding is associated with a flow in the flow list, and the bearer for data forwarding includes the first bearer. Operations in this scenario are further described with reference to FIG. 5.

In another possible implementation, the session management function network element may initially determine a flow for data forwarding.

In this scenario, before the session management function network element receives the information about the first bearer from the access and mobility management function network element, a method on the session management function network element side further includes determining, by the session management function network element based on association information, a bearer for data forwarding; and indicating, to the access and mobility management function network element, the bearer for data forwarding.

Correspondingly, before the access and mobility management function network element sends the information about the first bearer to the session management function network element, a method on the access and mobility management function network element side further includes learning, by the access and mobility management function network element from the session management function network element, of the bearer for data forwarding; and indicating, to a core network control plane network element in the first network, the bearer for data forwarding.

The bearer for data forwarding includes the first bearer. Operations in this scenario are further described with reference to FIG. 6.

In the foregoing two scenarios, the indicating, by the access and mobility management function network element to a core network control plane network element in the first network, the bearer for data forwarding includes sending, by the access and mobility management function network element, a request message to the core network control plane network element in the first network, where the request message includes information to be sent to an access network device in the first network, and the information to be sent to the access network device in the first network indicates the bearer for data forwarding. For example, the information to be sent to the access network device in the first network is a transparent container. This is further described with reference to FIG. 5 and FIG. 6.

Figure 4A:
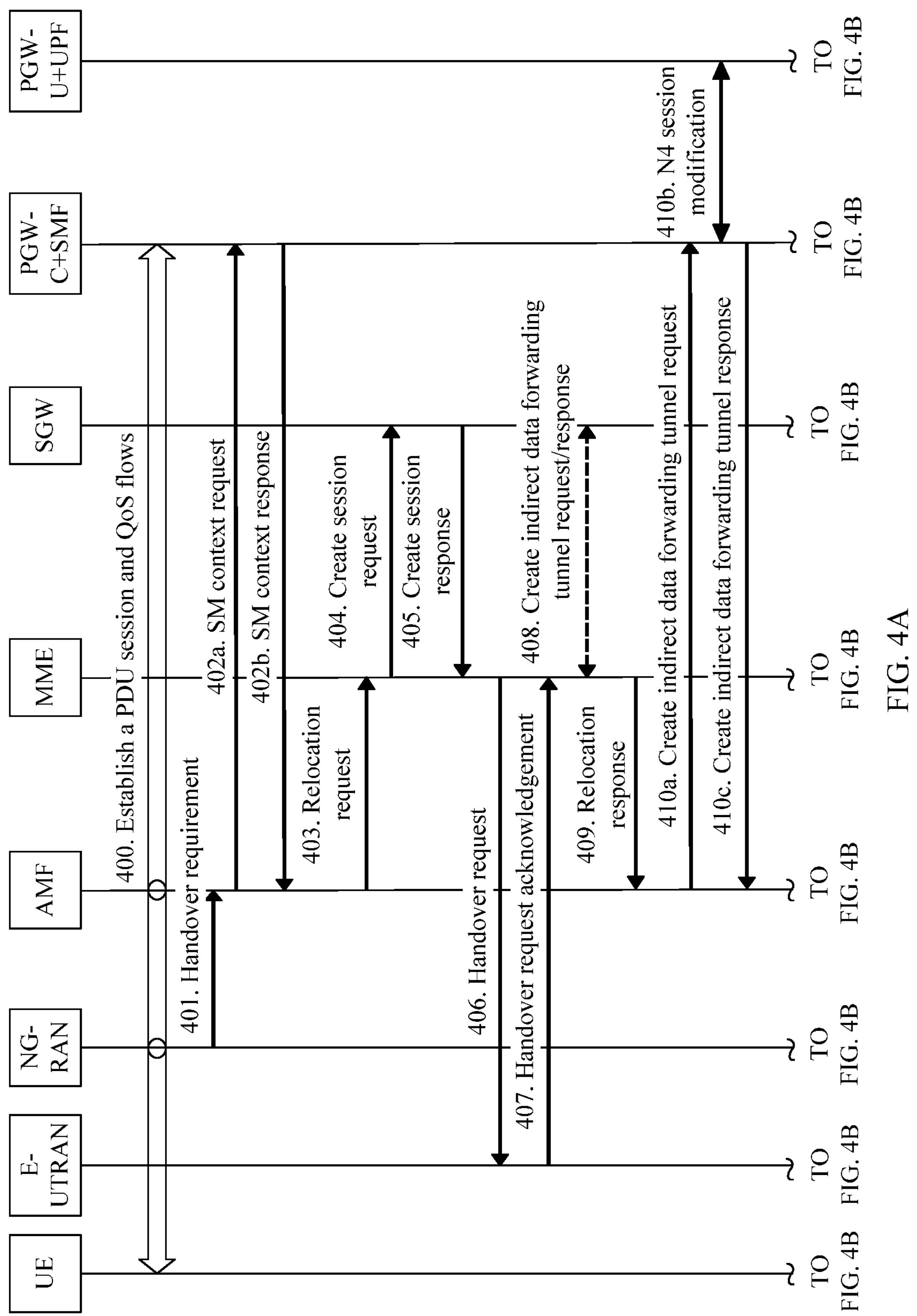
FIG. 4A and FIG. 4B are a signaling interaction diagram of a data forwarding method according to an embodiment of the present disclosure.
Figure 4B:
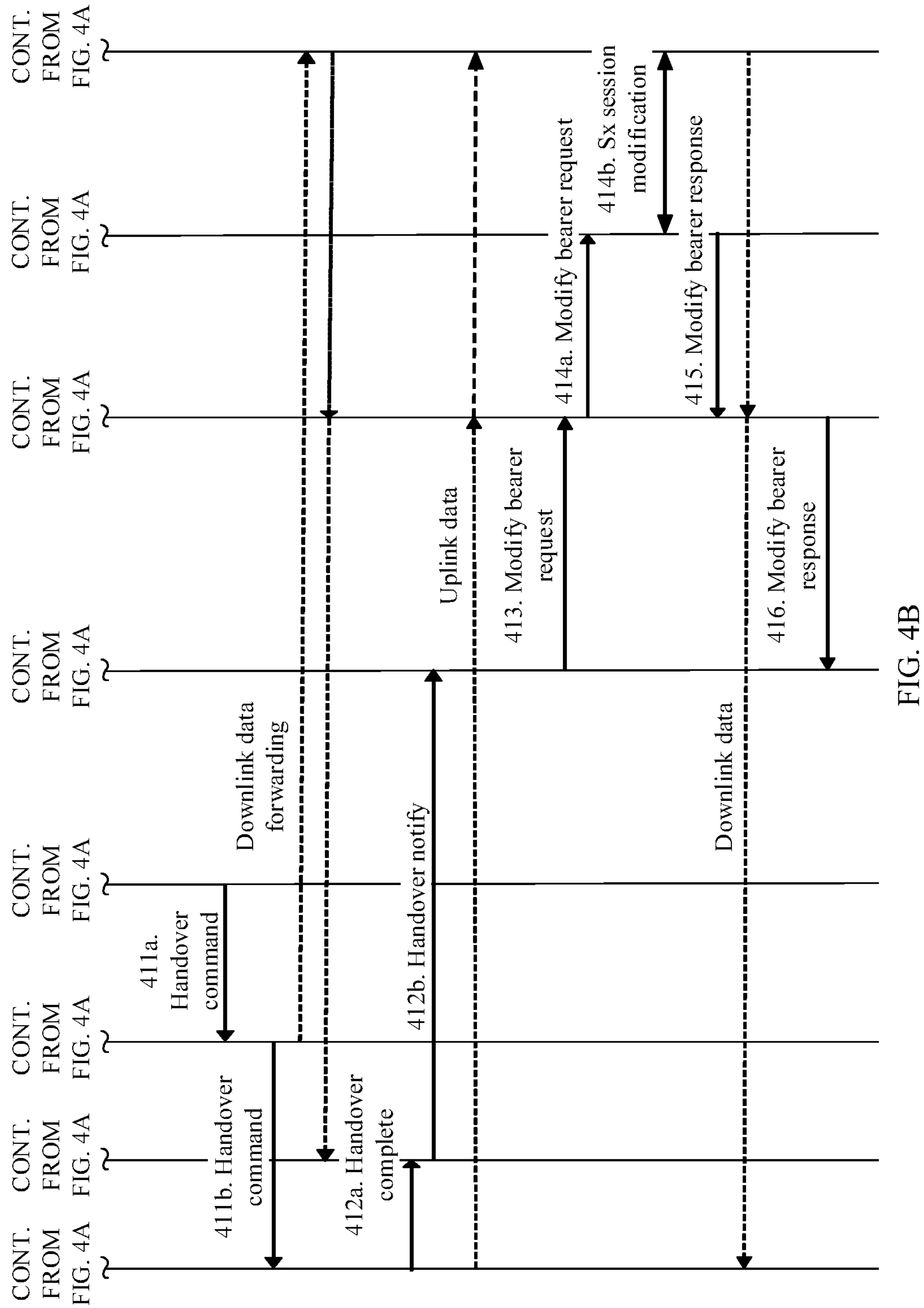

FIG. 4A and FIG. 4B are a signaling interaction diagram of a data forwarding method according to an embodiment of the present disclosure. FIG. 4A and FIG. 4B relate to interaction between UE, an access network device in a first network, a core network control plane function network element, an access network device in a second network, an access and mobility management function network element, a session management function network element obtained through integration of network elements in the first network and the second network, and a user plane function network element. In FIG. 4A and FIG. 4B, description is provided by using an example in which the access network device in the first network is the E-UTRAN, the core network control plane function network element is the MME, the access network device in the second network is the NG-RAN, the access and mobility management function network element is the AMF, the session management function network element obtained through integration of network elements in the first network and the second network is the PGW-C+SMF, and the user plane function network element is the PGW-U+UPF. As shown in FIG. 4A and FIG. 4B, the method includes the following steps.

Step 400, establish a PDU session and one or more QoS flows through interaction in a 5G network, where in this process, the SMF maps the one or more QoS flows to one or more EPS bearers in a 4G network, to obtain associations between the one or more QoS flows and the one or more EPS bearers.

Step 401, the NG-RAN determines that the UE should be handed over to the E-UTRAN. For example, when a new wireless condition or load balancing requirement or a specific QoS flow requirement is generated, the NG-RAN triggers a handover to the 4G network. The NG-RAN sends a handover required message to the AMF. The handover required message includes an identifier of a target base station (for example, a target eNB ID) in the 4G network.

Step 402*a*, the AMF learns, based on the identifier that is of the target base station in the 4G network and that is carried in a handover required message, that the handover is a handover to the E-UTRAN, and sends an SM context request message to the PGW-C+SMF corresponding to the UE, to request a session management context (SM Context).

Step 402*b*, the AMF receives, from the PGW-C+SMF, an SM context response message including the SM context.

Step 403, the AMF selects an MME, and sends a relocation request (which may also be referred to as a reconfiguration request) message to the MME, where the relocation request message carries the identifier of the target base station in the 4G network and the SM context.

Step 404, the MME selects an SGW, and sends a create session request message to the SGW.

Step 405, the SGW allocates a local resource, and returns a create session response message to the MME.

Step 406, the MME sends a handover request message to the target base station in the E-UTRAN based on the identifier of the target base station in the 4G network, where the handover request message carries an identifier of an EPS bearer that needs to be established, to request to establish the EPS bearer.

Step 407, the target base station in the E-UTRAN allocates a resource, and returns a handover request acknowledgement (Ack) message to the MME, where the handover request acknowledgement message includes an EPS Bearers setup list and an EPS Bearers failed to setup list. In other words, it is possible that in EPS bearers that the MME requests the E-UTRAN to establish, only one or some EPS bearers are successfully established, and the other EPS bearer(s) fail to be established.

Step 408, if the MME determines to forward data (that is, forward downlink data based on the forwarding path shown in FIG. 3), the MME sends a create indirect data forwarding tunnel request message to the SGW, where the message carries identification information of the target base station in the E-UTRAN, which is used for downlink data forwarding. For example, the identification information of the target base station in the E-UTRAN, which is used for downlink data forwarding, includes a TEID of the target base station in the E-UTRAN. Optionally, the identification information of the target base station in the E-UTRAN, which is used for downlink data forwarding, further includes an address of the target base station in the E-UTRAN.

The SGW returns a create indirect data forwarding tunnel response message to the MME. The message carries SGW information used for downlink data forwarding. For example, the SGW information used for downlink data forwarding includes a TEID of the SGW. Optionally, the SGW information used for downlink data forwarding further includes an address of the SGW.

Step 409, the MME sends a relocation response (which may also be referred to as a reconfiguration response) message to the AMF, where the relocation response message carries the SGW information used for downlink data forwarding.

Step 410*a*, if data is to be forwarded, the AMF sends a create indirect data forwarding tunnel request message to the PGW-C+SMF, where the message carries the SGW information used for downlink data forwarding (that is, information about a successfully established EPS bearer, and the successfully established EPS bearer includes the first bearer).

Step 410*b*, the PGW-C+SMF sends, to the PGW-U+UPF, the SGW information used for downlink data forwarding. For example, the PGW-C+SMF interacts with the PGW-U+UPF, and sends, in an N4 session modification process, to the PGW-U+UPF, the SGW information used for downlink data forwarding. Similarly, the SGW information includes the TEID of the SGW. For example, the TEID of the SGW may be an SGW TEID (which may be referred to as an SGW F-TEID) used for downlink data forwarding. Optionally, the SGW information may further include the address of the SGW.

In step 410*b*, core network tunnel information for data forwarding (CN tunnel information for data forwarding) is also allocated. In a possible implementation, the core network tunnel information for data forwarding is allocated by the PGW-C+SMF. The PGW-C+SMF sends, to the PGW-U+UPF, the allocated core network tunnel information for data forwarding, and the PGW-U+UPF returns a response to the PGW-C+SMF. In another possible implementation, the core network tunnel information for data forwarding is allocated by the PGW-U+UPF, and is provided for the PGW-C+SMF by using a response message.

The allocated core network tunnel information for data forwarding may be used as the forwarding information. The information may be at a granularity of a session, or may be at a granularity of a flow. Details are not repeated herein.

Step 410*c*, the PGW-C+SMF determines a flow for data forwarding (including the first flow), based on the information about the successfully established EPS bearer (the SGW information used for downlink data forwarding) that is obtained in step 410*a* and the association, obtained in step 400, between the QoS flow and the EPS bearer. That is, the PGW-C+SMF maps the information about the successfully established EPS bearer (the SGW information used for downlink data forwarding) that is obtained in step 410*a* to the flow for data forwarding (including the first flow), based on the association, obtained in step 400, between the QoS flow and the EPS bearer.

The PGW-C+SMF returns a create indirect data forwarding tunnel response message to the AMF. The message carries flow information of the flow for data forwarding (including the first flow) and the core network tunnel information for data forwarding (the forwarding information).

Step 411*a*, the AMF sends a handover command message to the NG-RAN, where the message carries the flow information of the flow for data forwarding (including the first flow) and the core network tunnel information for data forwarding (namely, the forwarding information). For a QoS flow indicated in the flow information, the NG-RAN sends the QoS flow to the PGW-U+UPF. For a QoS flow not included in the flow information, the NG-RAN does not send the QoS flow to the PGW-U+UPF.

Step 411*b*, the NG-RAN sends the handover command message to the UE.

At this time, the downlink data (for example, the first flow) is transmitted by using the forwarding path, a→b→c→d shown in FIG. 3, that is, PGW-U+UPF→NG-RAN→PGW-U+UPF→SGW→E-UTRAN.

Step 412*a*, after the UE successfully accesses the target base station in the E-UTRAN, the UE sends a handover complete message to the E-UTRAN.

Step 412*b*, the E-UTRAN sends a handover notify message to the MME.

Step 413, the MME sends a modify bearer request message to the SGW, to notify the SGW that the MME is responsible for one or more bearers established by the UE. For an EPS bearer that fails to be established, the MME releases a context of the EPS bearer.

Step 414*a*, the SGW sends the modify bearer request message to the PGW-C+SMF.

Step 414*b*, the PGW-C+SMF interacts with the PGW-U+UPF to implement Sx session modification. The PGW-U+UPF deletes a QoS flow to which no EPS bearer ID is allocated. Optionally, the PGW-U+UPF maps the deleted QoS flow to a default QoS flow.

Step 415, the PGW-C+SMF sends a modify bearer response message to the SGW.

At this time, a user plane path between the UE, the E-UTRAN, the SGW, and the PGW-U+UPF (which may also be referred to as a path of normal downlink data, that is, a→'→b' in FIG. 3) is established.

Step 416, the SGW sends the modify bearer response to the MME, to acknowledge a handover to a user plane path. That is, the downlink data is transmitted by using the path PGW-U+UPF→SGW→E-UTRAN.

Optionally, when a flow for data forwarding is corresponding to a plurality of bearers, one or more tunnels may be used to implement forwarding. For example, the plurality of bearers may form a tunnel for forwarding, or each of the plurality of bearers forms a tunnel for forwarding. This is not limited herein in the present disclosure.

Optionally, in step 410*b*, the PGW-C+SMF further determines a data forwarding rule, and sends the data forwarding rule to the PGW-U+UPF. The data forwarding rule indicates that a tunnel corresponding to the first bearer is used for forwarding the first flow. Therefore, after receiving a flow for data forwarding, the PGW-U+UPF may determine, according to the forwarding rule, a bearer corresponding to the flow, and further forward the flow by using a tunnel corresponding to the bearer.

Figure 5:
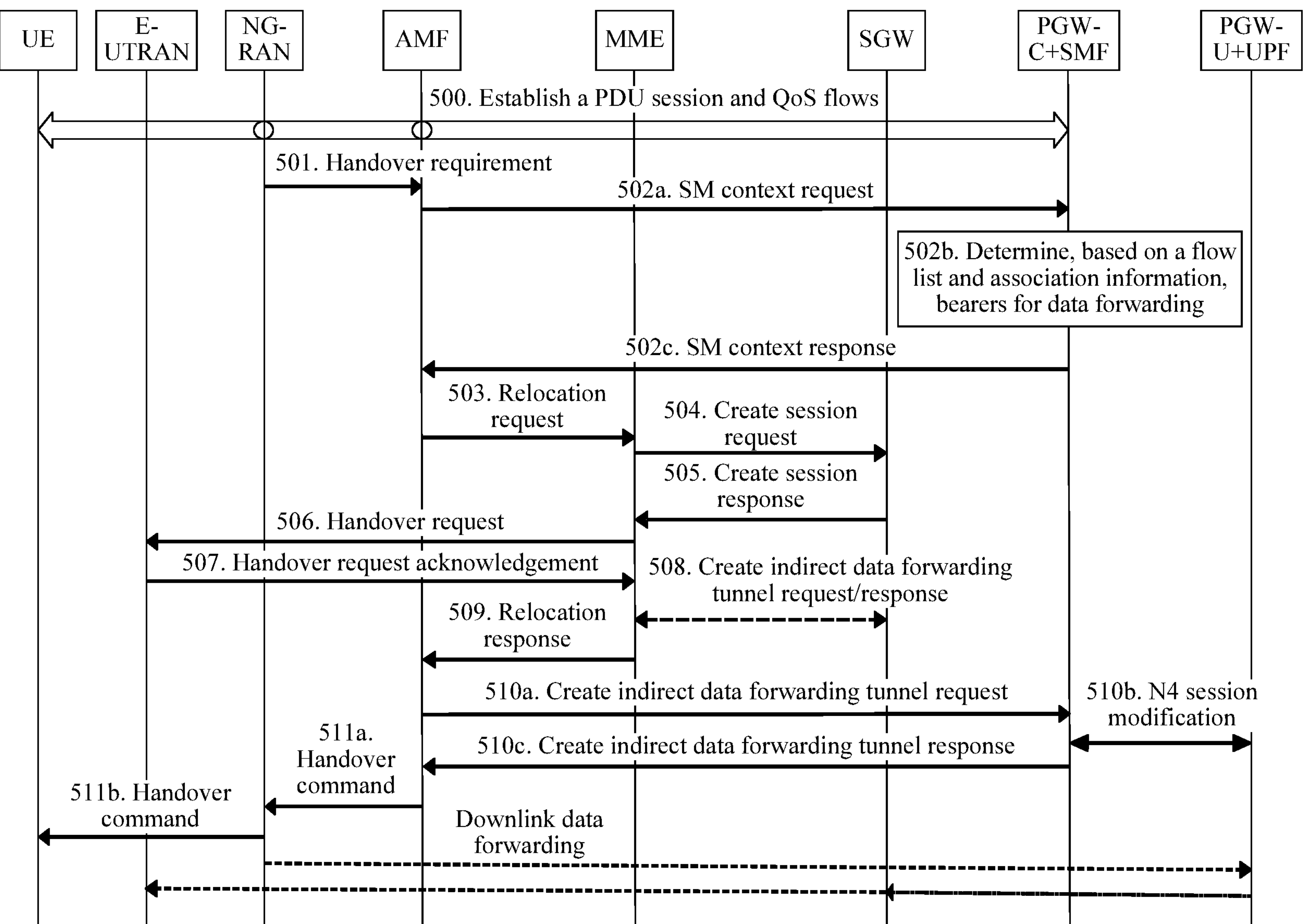
FIG. 5 is another signaling interaction diagram of a data forwarding method according to an embodiment of the present disclosure.

FIG. 5 is another signaling interaction diagram of a data forwarding method according to an embodiment of the present disclosure. FIG. 5 is applicable to a scenario in which an NG-RAN determines a flow for data forwarding. FIG. 5 is described with reference to FIG. 4A and FIG. 4B. As shown in FIG. 5, the method includes the following steps.

Step 500, establish a PDU session and one or more QoS flows through interaction in a 5G network, where in this process, the SMF maps the one or more QoS flows to one or more EPS bearers in a 4G network, to obtain associations between the one or more QoS flows and the one or more EPS bearers.

Step 501, the NG-RAN determines that the UE should be handed over to the E-UTRAN. For example, when a new wireless condition or load balancing requirement or a specific QoS flow requirement is generated, the NG-RAN triggers a handover to the 4G network.

In addition, the NG-RAN determines a list of flows for data forwarding. For example, the NG-RAN may obtain, from the SMF, QoS information (QoS profiles) of the flows, and determine, based on the QoS information, a specific flow required for data forwarding, to generate the list of flows for data forwarding. The one or more flows in the flow list are the one or more flows for data forwarding. For example, the flow list includes QFIs of the one or more flows for data forwarding.

The NG-RAN sends a handover required message to the AMF. The handover required message includes an identifier of a target base station in the 4G network, information to be sent to the target base station, and the list of flows for data forwarding. The information to be sent to the target base station may be a transparent container. More specifically, the information to be sent to the target base station may be a source to target transparent container.

Step 502*a*, the AMF learns, based on an identifier that is of a target base station in the 4G network and that is carried in a handover required message, that the handover is a handover to the E-UTRAN, and sends, to the PGW-C+SMF corresponding to the UE, an SM context request message carrying a flow list, to request an SM context.

Step 502*b*, the PGW-C+SMF determines one or more bearers for data forwarding, based on the flow list and the associations, obtained in step 500, between the one or more QoS flows and the one or more EPS bearers. The one or more bearers for data forwarding are associated with the one or more flows in the flow list in a one-to-one manner.

Step 502*c*, the AMF receives, from the PGW-C+SMF, an SM context response message including the SM context. The PGW-C+SMF may further indicate, to the AMF by using the SM context response message, the one or more bearers for data forwarding.

Step 503, the AMF selects an MME, and sends a relocation request message to the MME, where the relocation request message carries the identifier of the target base station in the 4G network and the SM context.

The AMF may further indicate, to the MME by using the relocation request message, the one or more bearers for data forwarding. For example, the relocation request message carries the information to be sent to the target base station, and the information to be sent to the target base station may indicate the one or more bearers for data forwarding. For example, the AMF inserts, into the information to be sent to the target base station, related information of the one or more bearers for data forwarding. Therefore, the information to be sent to the target base station includes the related information of the one or more bearers for data forwarding.

Step 504, the MME selects an SGW, and sends a create session request message to the SGW.

Step 505, the SGW allocates a local resource, and returns a create session response message to the MME.

Step 506, the MME sends a handover request message to the target base station in the E-UTRAN based on the identifier of the target base station in the 4G network, where the handover request message carries information to be sent to the target base station. That is, the MME indicates, to the E-UTRAN, the one or more bearers for data forwarding. After receiving the information to be sent to the target base station, the target base station in the E-UTRAN obtains, from the information to be sent to the target base station, the related information of the one or more bearers for data forwarding, and further allocates specific tunnel identifiers to the one or more bearers for data forwarding.

Steps 507 to 511*b* are similar to steps 407 to 411*b* in FIG. 4A and FIG. 4B. Reference may be made to the description of FIG. 4A and FIG. 4B, and details are not repeated herein.

It should be noted that, in the example in FIG. 5, the NG-RAN first determines the list of flows for data forwarding, and the PGW-C+SMF maps, based on association information, the one or more flows to the one or more bearers for data forwarding. The one or more bearers for data forwarding are finally transmitted to the target base station in the E-UTRAN through the PGW-C+SMF, the AMF, and the MME, and the target base station in the E-UTRAN determines specific bearers, in these bearers for data forwarding, that can be successfully established. These bearers that are required for data forwarding and that are successfully established are transmitted to the PGW-C+SMF by using steps 507, 509, and 510*a*, and the PGW-C+SMF maps again, based on the association information, the bearers to one or more flows that can finally implement data forwarding. Therefore, the PGW-C+SMF performs mapping twice, and the flows obtained after the final mapping may be a subset of the list, determined by the NG-RAN, of flows for data forwarding. In other words, the flow list includes the first flow, and the one or more bearers for data forwarding that are determined in step 502*b* include the first bearer.

In addition, the target base station in the E-UTRAN allocates tunnel identifiers based on the one or more bearers for data forwarding that are indicated by the MME. In some approaches, the target base station in the E-UTRAN uses one tunnel identifier to receive forwarded data and normal downlink data. Consequently, a disorder may occur after a path handover, causing degradation of transmission performance. However, in the present disclosure, the target base station in the E-UTRAN allocates the tunnel identifiers based on the one or more bearers for data forwarding that are indicated by the MME. In this way, forwarded downlink data and normal downlink data are differentiated from each other by using different tunnel identifiers, thereby avoiding a disorder of downlink data.

Figure 6:
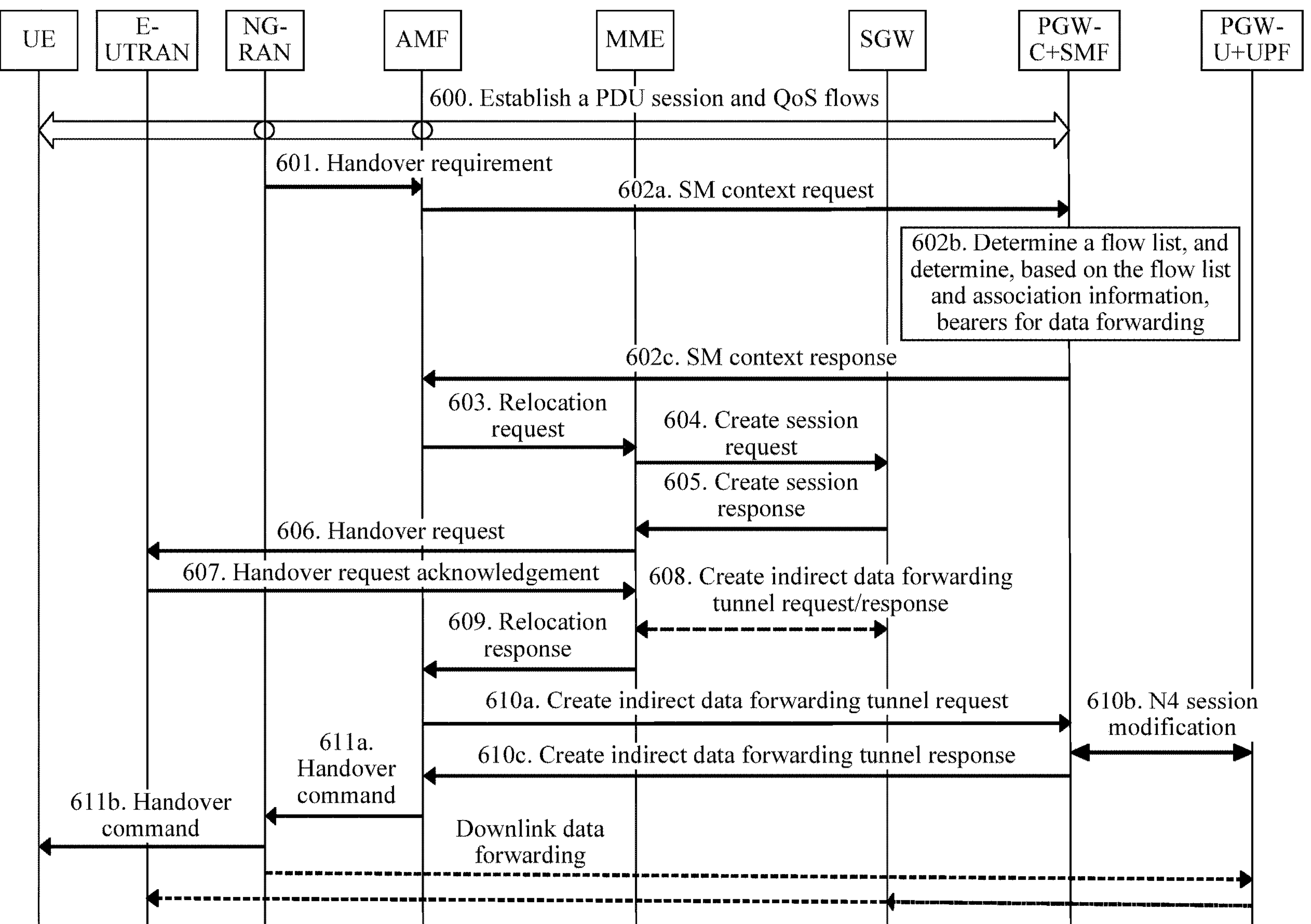
FIG. 6 is still another signaling interaction diagram of a data forwarding method according to an embodiment of the present disclosure.

FIG. 6 is still another signaling interaction diagram of a data forwarding method according to an embodiment of the present disclosure. FIG. 6 is applicable to a scenario in which a PGW-C+SMF determines a flow for data forwarding. FIG. 6 is described with reference to FIG. 4A, FIG. 4B, and FIG. 5. As shown in FIG. 6, the method includes the following steps.

Step 600, establish a PDU session and one or more QoS flows through interaction in a 5G network, where in this process, the SMF maps the one or more QoS flows to one or more EPS bearers in a 4G network, to obtain associations between the one or more QoS flows and the one or more EPS bearers.

Step 601, the NG-RAN determines that the UE should be handed over to the E-UTRAN. For example, when a new wireless condition or load balancing requirement or a specific QoS flow requirement is generated, the NG-RAN triggers a handover to the 4G network. The NG-RAN sends a handover required message to the AMF. The handover required message includes an identifier of a target base station in the 4G network and information to be sent to the target base station. The information to be sent to the target base station may be a transparent container. More specifically, the information to be sent to the target base station may be a source to target transparent container.

Step 602*a*, the AMF learns, based on an identifier that is of a target base station in the 4G network and that is carried in a handover required message, that the handover is a handover to the E-UTRAN, and sends an SM context request message to the PGW-C+SMF corresponding to the UE, to request an SM context.

Step 602*b*, the PGW-C+SMF determines a list of flows for data forwarding. For example, the PGW-C+SMF stores QoS information (QoS profiles) of the flows, and determines, based on the QoS information, flows required for data forwarding, to generate the list of flows for data forwarding. The one or more flows in the flow list are the one or more flows for data forwarding. For example, the flow list includes QFIs of the one or more flows for data forwarding.

The PGW-C+SMF determines one or more bearers for data forwarding, based on the flow list and the associations, obtained in step 600, between the one or more QoS flows and the one or more EPS bearers. The one or more bearers for data forwarding are associated with the one or more flows in the flow list in a one-to-one manner.

Steps 602*c* to 606 are similar to steps 502*c* to 506 in FIG. 5. Reference may be made to the description of FIG. 5, and details are not repeated herein.

Steps 607 to 611*b* are similar to steps 407 to 411*b* in FIG. 4A and FIG. 4B. Reference may be made to the description of FIG. 4A and FIG. 4B, and details are not repeated herein.

It should be noted that, in the example in FIG. 6, the PGW-C+SMF first determines the list of flows for data forwarding, and maps, based on association information, the one or more flows to the one or more bearers for data forwarding. The one or more bearers for data forwarding are finally transmitted to the target base station in the E-UTRAN through the PGW-C+SMF, the AMF, and the MME, and the target base station in the E-UTRAN determines specific bearers, in these bearers for data forwarding, that can be successfully established. These bearers that are required for data forwarding and that are successfully established are transmitted to the PGW-C+SMF by using steps 607, 609, and 610*a*, and the PGW-C+SMF maps again, based on the association information, the bearers to one or more flows that can finally implement data forwarding. Therefore, the PGW-C+SMF performs mapping twice, and the flows obtained after the final mapping may be a subset of the list, determined by the PGW-C+SMF, of flows for data forwarding. In other words, the flow list includes the first flow, and the one or more bearers for data forwarding that are determined in step 602*b* include the first bearer.

In addition, the target base station in the E-UTRAN allocates tunnel identifiers based on the one or more bearers for data forwarding that are indicated by the MME. In some approaches, the target base station in the E-UTRAN uses one tunnel identifier to receive forwarded data and normal downlink data. Consequently, a disorder may occur after a path handover, causing degradation of transmission performance. However, in the present disclosure, the target base station in the E-UTRAN allocates the tunnel identifiers based on the one or more bearers for data forwarding that are indicated by the MME. In this way, forwarded downlink data and normal downlink data are differentiated from each other by using different tunnel identifiers, thereby avoiding a disorder of downlink data.

It should be noted that the messages in FIG. 4A to FIG. 6 may have other names. In addition, information transmission between the network elements may also be implemented by invoking network functions of the network elements in a service-oriented architecture. This is not limited herein in the present disclosure.

In the foregoing embodiments provided in this application, solutions such as the data forwarding method provided in the embodiments of this application are described from perspectives of the network elements and interaction between the network elements. It can be understood that, to implement the foregoing functions, the network element such as the session management function network element, the access and mobility management function network element, or the access network device includes corresponding hardware structures and/or software modules for implementing the functions. A person skilled in the art may be easily aware that, units and algorithm steps of each example described with reference to the embodiments disclosed in this specification can be implemented in a form of hardware or a form of a combination of hardware and computer software in this application. Whether the functions are implemented by hardware or computer software driving hardware depends on particular applications and design constraint conditions of the technical solutions. A person skilled in the art may use different methods to implement the described functions for each particular application, but it should not be considered that the implementation goes beyond the scope of this application.

Figure 7:
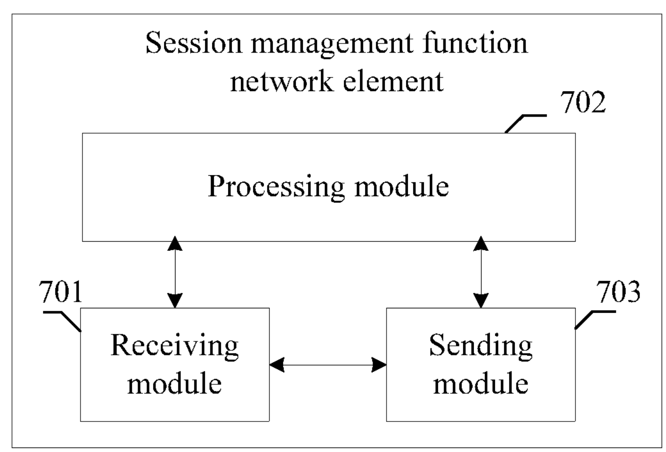
FIG. 7 is a schematic structural diagram of a data forwarding apparatus according to embodiments of the present disclosure.
Figure 8:
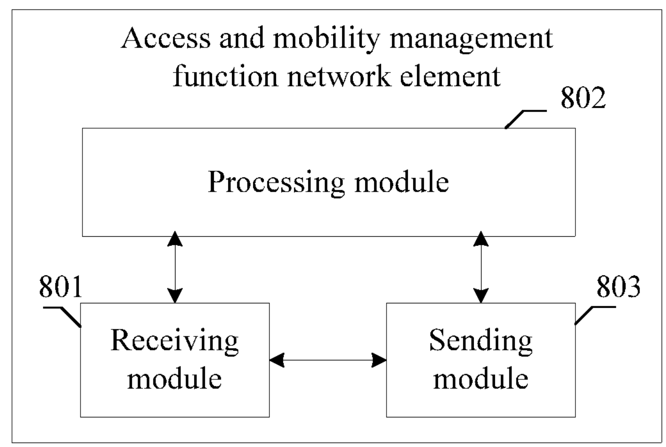
FIG. 8 is a schematic structural diagram of a data forwarding apparatus according to embodiments of the present disclosure.

For example, when the foregoing network elements implement the corresponding functions by using software modules, as shown in FIG. 7, a session management function network element may include a receiving module 701, a processing module 702, and a sending module 703. The session management function network element may be configured to perform operations of the session management function network element or the PGW-C+SMF in FIG. 2 and FIG. 4A to FIG. 6.

For example, the receiving module 701 is configured to receive information about a first bearer in a first network from an access and mobility management function network element. The sending module 703 is configured to send flow information of a first flow in a second network and forwarding information to the access and mobility management function network element. The flow information indicates a flow for data forwarding, and the forwarding information is used for forwarding the first flow to a tunnel corresponding to the first bearer.

Therefore, the session management function network element sends the flow information and the forwarding information to the access and mobility management function network element, and then the access and mobility management function network element provides the flow information and the forwarding information for an access network device in the second network. The access network device in the second network may send, to a user plane function network element based on the flow information and the forwarding information, only a flow required for data forwarding, so the access network device does not need to forward all flows to the user plane function network element, thereby reducing transmission resources.

Optionally, the processing module 702 is configured to determine the first flow based on the information about the first bearer and association information. The association information indicates an association between the first flow and the first bearer.

Optionally, before receiving the information about the first bearer in the first network from the access and mobility management function network element, the receiving module 701 is further configured to receive a flow list from the access and mobility management function network element, where the flow list includes the flow information; the processing module 702 is further configured to determine, based on the flow list and the association information, a bearer for data forwarding, where the bearer for data forwarding is associated with a flow in the flow list, and the bearer for data forwarding includes the first bearer; and the sending module 703 is further configured to indicate, to the access and mobility management function network element, the bearer for data forwarding.

Optionally, before the information about the first bearer in the first network is received from the access and mobility management function network element, the processing module 702 is further configured to determine, based on the association information, a bearer for data forwarding, where the bearer for data forwarding includes the first bearer; and the sending module 703 is further configured to indicate, to the access and mobility management function network element, the bearer for data forwarding.

Optionally, before the information about the first bearer in the first network is received from the access and mobility management function network element, the processing module 702 is further configured to determine a flow list, where the flow list includes the flow information; and determine, based on the flow list and the association information, a bearer for data forwarding, where the bearer for data forwarding includes the first bearer; and the sending module 703 is further configured to indicate, to the access and mobility management function network element, the bearer for data forwarding.

In a possible implementation, the flow information further includes identification information of a second flow in the second network, and the forwarding information is used for forwarding the first flow to the tunnel corresponding to the first bearer and for forwarding the second flow to a tunnel corresponding to a second bearer.

In another possible implementation, the flow information further includes identification information of a second flow in the second network, and the forwarding information includes first forwarding information and second forwarding information. The first forwarding information is used for forwarding the first flow to the tunnel corresponding to the first bearer, and the second forwarding information is used for forwarding the second flow to a tunnel corresponding to a second bearer. Further, optionally, the processing module

702 is configured to allocate the first forwarding information to the first flow, and allocate the second forwarding information to the second flow.

Optionally, the processing module 702 is further configured to determine a data forwarding rule, and the sending module 703 is further configured to send the data forwarding rule to a user plane function network element. The data forwarding rule indicates that the tunnel corresponding to the first bearer is used for forwarding the first flow.

In addition, the receiving module 701, the processing module 702, and the sending module 703 in the session management function network element may further implement other operations or functions of the session management function network element or the PGW-C+SMF in the foregoing methods. Details are not repeated herein.

As shown in FIG. 7, an access and mobility management function network element may include a receiving module 801, a processing module 802, and a sending module 803. The access and mobility management function network element may be configured to perform operations of the access and mobility management function network element or the AMF in FIG. 2 and FIG. 4A to FIG. 6.

For example, the sending module 803 is configured to send information about a first bearer in a first network to a session management function network element. The receiving module 801 is configured to receive flow information of a first flow in a second network and forwarding information from the session management function network element. The flow information indicates a flow for data forwarding, and the forwarding information is used for forwarding the first flow to a tunnel corresponding to the first bearer.

Therefore, after receiving the flow information and the forwarding information from the session management function network element, the access and mobility management function network element sends the flow information and the forwarding information to an access network device in the second network. The access network device in the second network may send, to a user plane function network element based on the flow information and the forwarding information, only a flow required for data forwarding, so the access network device does not need to forward all flows to the user plane function network element, thereby reducing transmission resources.

Optionally, before sending the information about the first bearer in the first network to the session management function network element, the sending module 803 is further configured to send a flow list to the session management function network element, where the flow list includes the flow information; the receiving module 801 is further configured to learn, from the session management function network element, of a bearer for data forwarding, where the bearer for data forwarding is associated with a flow in the flow list, and the bearer for data forwarding includes the first bearer; and the sending module 803 is further configured to indicate, to a core network control plane network element in the first network, the bearer for data forwarding.

Optionally, before the information about the first bearer in the first network is sent to the session management function network element, the receiving module 801 is further configured to learn, from the session management function network element, of a bearer for data forwarding, where the bearer for data forwarding includes the first bearer; and the sending module 803 is further configured to indicate, to a core network control plane network element in the first network, the bearer for data forwarding.

Further, optionally, the sending module 803 is configured to send a request message to the core network control plane network element in the first network. The request message includes information to be sent to an access network device in the first network, and the information to be sent to the access network device in the first network indicates the bearer for data forwarding.

In a possible implementation, the flow information further includes identification information of a second flow in the second network, and the forwarding information is used for forwarding the first flow to the tunnel corresponding to the first bearer and for forwarding the second flow to a tunnel corresponding to a second bearer.

In another possible implementation, the flow information further includes identification information of a second flow in the second network, and the forwarding information includes first forwarding information and second forwarding information. The first forwarding information is used for forwarding the first flow to the tunnel corresponding to the first bearer, and the second forwarding information is used for forwarding the second flow to a tunnel corresponding to a second bearer.

In addition, the receiving module 801, the processing module 802, and the sending module 803 in the access and mobility management function network element may further implement other operations or functions of the access and mobility management function network element or the AMF in the foregoing methods. Details are not repeated herein.

Figure 9:
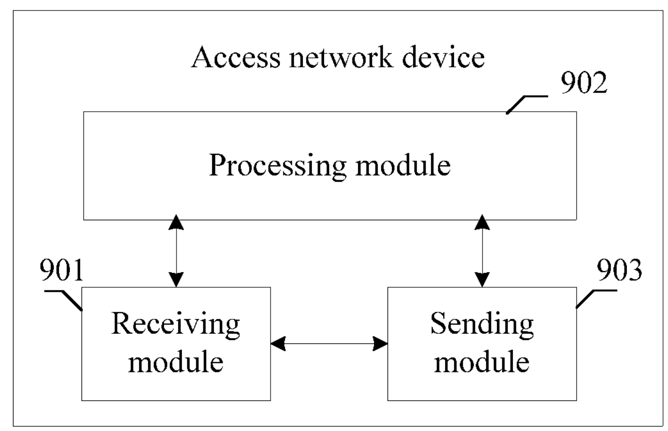
FIG. 9 is a schematic structural diagram of a data forwarding apparatus according to embodiments of the present disclosure.

As shown in FIG. 9, an access network device may include a receiving module 901, a processing module 902, and a sending module 903. The access network device may be configured to perform operations of the access network device or the NG-RAN in FIG. 2 and FIG. 4A to FIG. 6.

For example, the receiving module 901 is configured to receive flow information of a first flow in a second network and forwarding information from an access and mobility management function network element. The flow information indicates a flow for data forwarding, and the forwarding information is used for forwarding the first flow to a tunnel corresponding to a first bearer in a first network. The receiving module 901 is further configured to receive the first flow. The sending module 903 is configured to send the first flow to a user plane function network element based on the flow information and the forwarding information.

Therefore, after receiving the flow information and the forwarding information from the access and mobility management function network element, the access network device in the second network may send, to the user plane function network element based on the flow information and the forwarding information, only a flow required for data forwarding, so the access network device does not need to forward all flows to the user plane function network element, thereby reducing transmission resources.

Optionally, the processing module 902 is configured to determine a flow list.

Optionally, the sending module 903 is further configured to send the flow list to the access and mobility management function network element. The flow list is used to determine a bearer for data forwarding, the flow list includes the flow information, the bearer for data forwarding is associated with a flow in the flow list, and the bearer for data forwarding includes the first bearer.

In a possible implementation, the flow information further includes identification information of a second flow in the second network, and the forwarding information is used for forwarding the first flow to the tunnel corresponding to the first bearer and for forwarding the second flow to a tunnel corresponding to a second bearer.

In another possible implementation, the flow information further includes identification information of a second flow in the second network, and the forwarding information includes first forwarding information and second forwarding information. The first forwarding information is used for forwarding the first flow to the tunnel corresponding to the first bearer, and the second forwarding information is used for forwarding the second flow to a tunnel corresponding to a second bearer.

In addition, the receiving module 901, the processing module 902, and the sending module 903 in the access network device may further implement other operations or functions of the access network device or the NG-RAN in the foregoing methods. Details are not repeated herein.

An embodiment of this application further discloses a data forwarding system, including the session management function network element, the access and mobility management function network element, and the access network device. For interaction in the system, refer to any of the descriptions of FIG. 2 and FIG. 4A to FIG. 6. Details are not repeated herein.

Figure 10:
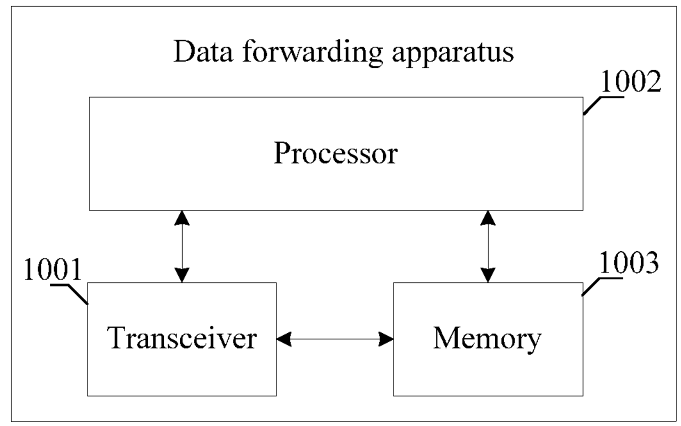
FIG. 10 is a schematic structural diagram of a data forwarding apparatus according to embodiments of the present disclosure.

FIG. 10 is a schematic structural diagram of a data forwarding apparatus in the foregoing embodiments. As shown in FIG. 10, the data forwarding apparatus includes a transceiver 1001 and a processor 1002. In an embodiment, the processor 1002 is configured to perform corresponding functions of the session management function network element in the foregoing methods, and the transceiver 1001 is configured to implement communication between the session management function network element and an access and mobility management function network element/a user plane function network element. In another embodiment, the processor 1002 is configured to perform corresponding functions of the access and mobility management function network element in the foregoing methods, and the transceiver 1001 is configured to implement communication between the access and mobility management function network element and a session management function network element/an access network device in a second network/a core network control plane network element in a first network. In still another embodiment, the processor 1002 is configured to process and perform corresponding functions of the access network device in the second network in the foregoing methods, and the transceiver 1001 is configured to implement communication between the access network device and an access and mobility management function network element/a user plane function network element. The data forwarding apparatus may further include a memory 1003. The memory 1003 is configured to be coupled to the processor 1002, and the memory 1003 stores a necessary program instruction and data of the data forwarding apparatus.

The memory 1003 may store a program instruction used to trigger the processor 1002 to perform the foregoing functions. The processor 1002 may perform the foregoing functions by invoking the program instruction in the memory 1003. Alternatively, a computer readable storage medium stores a program instruction used to trigger the processor 1002 to perform the foregoing functions. The processor 1002 may perform the foregoing functions by invoking the program instruction in the computer readable storage medium. The computer readable storage medium also falls within the protection scope of the present disclosure.

It can be understood that FIG. 10 shows only a simplified design of the foregoing apparatuses. In actual application, each of the foregoing devices may include any quantities of transmitters, receivers, processors, controllers, memories, communications units, and the like. All devices that can implement this application fall within the protection scope of this application.

A controller/processor configured to implement the session management function network element in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logic blocks, modules, and circuits that are described with reference to the content disclosed in this application. The processor may also be a combination that implements a computing function, for example, a combination of one or more microprocessors or a combination of a DSP and a microprocessor.

The methods or algorithm steps described with reference to the content disclosed in this application may be implemented in a hardware manner, or may be implemented in a manner of executing a software instruction by a processor. The software instruction may include a corresponding software module. The software module may be stored in a RAM memory, a flash memory, a read only memory (ROM), an electronically programmable ROM (EPROM), an electrically erasable programmable ROM (EEPROM), a register, a hard disk, a removable hard disk, a CD-ROM, or a storage medium in any other forms well-known in the art. An example storage medium is coupled to the processor, so that the processor can read information from the storage medium, and can write information into the storage medium. The storage medium may also be a part of the processor. The processor and the storage medium may be located in an ASIC. In addition, the ASIC may be located in the session management function network element. The processor and the storage medium may also exist in the session management function network element as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A data forwarding method, comprising:

sending, by an access and mobility management function device to a session management function device, information about a first bearer in a first network;

receiving, by the session management function device, the information about the first bearer;

determining, by the session management function device, a first flow for data forwarding in a second network based on the information about the first bearer and association information, wherein the association information indicates an association between the first flow in the second network and the first bearer in the first network, and wherein the first network and the second network are different networks; and sending, by the session management function device to an access network device in the second network via the access and mobility management function device, flow information of the first flow in the second network and forwarding information, wherein the flow information indicates the first flow for data forwarding, and wherein the forwarding information is for forwarding the first flow to a tunnel corresponding to the first bearer.

2. The method of claim 1, further comprising:

receiving, by the access network device from the access and mobility management function device, the flow information and the forwarding information;

receiving, by the access network device, a flow from a first user plane function device; and sending the flow to a second user plane function device based on the forwarding information when the flow is the first flow indicated in the flow information.

3. The method of claim 2, wherein either the first user plane function device is the second user plane function device or the first user plane function device is not the second user plane function device.

4. The method of claim 1, wherein the forwarding information comprises core network tunnel information for data forwarding.

5. The method of claim 1, wherein the forwarding information is allocated by a user plane function device or is allocated by the session management function device.

6. The method of claim 1, wherein the first bearer in the first network is an evolved packet system (EPS) bearer in a 4$^{th}$ generation (4G) network, and wherein the first flow in the second network is a quality of service (QoS) flow in a 5$^{th}$ generation (5G) network.

7. The method of claim 1, wherein the forwarding information is at a granularity of a session.

8. The method of claim 1, further comprising:

determining, by the session management function device, a data forwarding rule; and sending the data forwarding rule to a user plane function device, wherein the data forwarding rule indicates that the tunnel corresponding to the first bearer is for forwarding the first flow.

9. A data forwarding system, comprising:

an access and mobility management function device configured to send information about a first bearer in a first network; and a session management function device configured to:

receive the information about the first bearer;

determine a first flow for data forwarding in a second network based on the information about the first bearer and association information, wherein the association information indicates an association between the first flow in the second network and the first bearer in the first network, and wherein the first network and the second network are different networks; and send, to an access network device in the second network via the access and mobility management function device, flow information of the first flow in the second network and forwarding information, wherein the flow information indicates the first flow for data forwarding, and wherein the forwarding information is for forwarding the first flow to a tunnel corresponding to the first bearer.

10. The data forwarding system of claim 9, wherein the access network device is configured to:

receive the flow information and the forwarding information from the access and mobility management function device;

receive a flow from a first user plane function device; and send the flow to a second user plane function device based on the forwarding information when the flow is the first flow indicated in the flow information.

11. The data forwarding system of claim 10, wherein either the first user plane function device is the second user plane function device or the first user plane function device is not the second user plane function device.

12. The data forwarding system of claim 9, wherein the forwarding information comprises core network tunnel information for data forwarding.

13. The data forwarding system of claim 9, wherein the forwarding information is allocated by a user plane function device or is allocated by the session management function device.

14. The data forwarding system of claim 9, wherein the first bearer in the first network is an evolved packet system (EPS) bearer in a 4$^{th}$ generation (4G) network, and wherein the first flow in the second network is a quality of service (QoS) flow in a 5$^{th}$ generation (5G) network.

15. The data forwarding system of claim 9, wherein the forwarding information is at a granularity of a session.

16. The data forwarding system of claim 9, wherein the session management function device is further configured to:

determine a data forwarding rule; and send the data forwarding rule to a user plane function device, wherein the data forwarding rule indicates that the tunnel corresponding to the first bearer is for forwarding the first flow.

17. The method of claim 1, wherein the information about the first bearer comprises identification information of the first bearer.

18. The method of claim 1, wherein the information about the first bearer comprises an address of a serving gateway and a tunnel endpoint identifier (TEID) of the serving gateway for forwarding downlink data.

19. The method of claim 1, wherein the first bearer is successfully established by an access network device in the first network.

20. The data forwarding system of claim 9, wherein the information about the first bearer comprises at least one of:

identification information of the first bearer; or an address of a serving gateway and a tunnel endpoint identifier (TEID) of the serving gateway for forwarding downlink data.

* * * * *